(12) United States Patent
Giroti et al.

(10) Patent No.: US 7,492,873 B2
(45) Date of Patent: *Feb. 17, 2009

(54) VOICE/DATA SESSION SWITCHING IN A CONVERGED APPLICATION DELIVERY ENVIRONMENT

(75) Inventors: Sudhir K. Giroti, Acton, MA (US); Mandakini Pahooja, Acton, MA (US)

(73) Assignee: Azurn Networks, Inc., Waltham, MA (US)

( * ) Notice: Subject to any disclaimer, the term of this patent is extended or adjusted under 35 U.S.C. 154(b) by 684 days.

This patent is subject to a terminal disclaimer.

(21) Appl. No.: 10/423,522

(22) Filed: Apr. 25, 2003

(65) Prior Publication Data
US 2005/0129198 A1 Jun. 16, 2005

Related U.S. Application Data

(60) Provisional application No. 60/375,501, filed on Apr. 25, 2002.

(51) Int. Cl.
*H04M 1/64* (2006.01)

(52) U.S. Cl. .......... 379/88.17; 379/90.01; 709/217; 709/218; 709/219; 709/227; 370/351; 370/352; 370/356; 370/422; 370/426; 370/389; 370/493; 370/495

(58) Field of Classification Search .......... 379/88.17, 379/90.01; 709/217, 218, 219, 227, 311; 370/351–356, 422, 426, 493–495, 389
See application file for complete search history.

(56) References Cited

U.S. PATENT DOCUMENTS 5,764,736 A * 6/1998 Shachar et al. .......... 379/93.09
5,857,197 A * 1/1999 Mullins .................. 707/103 R

* cited by examiner

*Primary Examiner*—Quynh H Nguyen
(74) *Attorney, Agent, or Firm*—Mark Levy; Hinman, Howard & Kattell

(57) ABSTRACT

An integrated voice and data application delivery system that can deliver converged voice/data application services to at least one user device over at least one communications network, and optimize the delivery of voice/data content during a current voice/data session based on the bandwidth of the network and/or the capacity of the user device. The integrated application delivery system allows users to switch from one voice/data session to another in response to a predetermined event, as required to avoid a loss of information or a permanent interruption of service. The integrated voice and data application delivery system includes a unified XML-based integrated voice and data media converging switch, a controller coupled to the switch, and a data storage device coupled to the controller. The switch transfers voice/data content between voice/data applications on a first network and one or more user devices on a second network.

9 Claims, 7 Drawing Sheets

| Type | Media | Device | Carrier | Media | Device | Carrier | Switching Cause | Actions |
|---|---|---|---|---|---|---|---|---|
| 1 | Voice | A | C1 | Voice | A | C1 | RO | PR |
| 2 | Voice | A | C1 | Voice | A | C2 | NN | NA |
| 3 | Voice | A | C1 | Voice | B | C1 | NN, IR, UI, NC, EV | SS, AU |
| 4 | Voice | A | C1 | Voice | B | C2 | RO, IR, UI, NC, EV | SS, AU |
| 5 | Voice | A | C1 | Data | A | C1 | RO, IR, UI, EV | SS, SM*, CT, AC, BW |
| 6 | Voice | A | C1 | Data | A | C2 | RO, IR, UI, EV | SS, SM*, AU, CT, AC, BW |
| 7 | Voice | A | C1 | Data | B | C1 | RO, IR, UI, NC, EV | SS, SM*, AU, CT, AC, BW |
| 8 | Voice | A | C1 | Data | B | C2 | RO, IR, UI, NC, EV | SS, SM*, AU, CT, AC, BW |
| 9 | Data | A | C1 | Data | A | C1 | RO | MI, SS, CT, AC, BW |
| 10 | Data | A | C1 | Data | A | C2 | RO, IR, UI, EV | MI, SS, AU, CT, BW |
| 11 | Data | A | C1 | Data | B | C1 | UI, EV | MI, SS, AU, CT, AC, BW |
| 12 | Data | A | C1 | Data | B | C2 | RO, IR, UI, NC, EV | MI, SS, AU, CT, AC, BW |
| 13 | Data | A | C1 | Voice | A | C1 | RO, IR, UI, NC, EV | SS, SM*, AU*, CT |
| 14 | Data | A | C1 | Voice | A | C2 | RO, IR, UI, NC, EV | SS, SM*, AU, T |
| 15 | Data | A | C1 | Voice | B | C1 | RO, IR, UI, NC, EV | SS, SM*, AU*, CT |
| 16 | Data | A | C1 | Voice | B | C2 | RO, IR, UI, NC, EV | SS, SM*, AU, CT |

Switching Cause
*RO:* User roaming from one network service area to another (of same of different carrier)
*IR:* Unscheduled service interruption (or some times scheduled)
*UI:* User Initiated / Intentional
*NC:* A network reaching its maximum capability or utilization level
*EV:* Scheduled or Unscheduled event
*NN:* Not a Norm

Actions Performed during Session Switching
*PR: None* (Prior Art)
*NA:* Not Applicable
*SS:* Switch Session
*SM:* Connect second session simultaneously while keeping the previous alive
*AU:* Authentication required when second session connected
*CT:* Content Transformation
*AC:* Adaptive content Transformation
*BW:* Bandwidth sensitive
*MI:* Implemented MobileIP specification \* symbolizes that the action is optional Media=Voice in this chart means: Voice that is delivered
 (a) over PSTN networks,
 (b) Wireless networks,
 (c) Broadband networks and
 (d) Voice as delivered over IP networks (VoIP).

Media=Data in this chart means: data that is delivered
 (a) over PSTN networks through modem, DSM, XDSL, ISDN or other protocols
 (b) Data in a local area network
 (c) Data in a wide area network
 (d) Data delivered over public Internet

Fig 9: Session Switching Chart

VOICE/DATA SESSION SWITCHING IN A CONVERGED APPLICATION DELIVERY ENVIRONMENT

RELATED APPLICATIONS

This application is a continuation in part of U.S. Provisional application Ser. No. 60/375,501, filed Apr. 25, 2002 and claims priority thereto under 35 U.S.C. §119e, and is included herein in its entirety by reference.

BACKGROUND OF THE INVENTION

The present invention relates generally to communications systems, and more specifically to the delivery of converged voice and data application services to one or more user devices over one or more communications networks.

An integrated voice and data application delivery system is disclosed in the U.S. Patent Application entitled Unified XML Voice and Data Media Converging Switch and Application Delivery System, which was filed on Mar. 26, 2002 and assigned to the same assignee as the present invention. The disclosed integrated application delivery system comprises a unified XML-based integrated voice and data media converging switch coupled between at least one first communications network and at least one second communications network. The first network is configured to convey respective voice and data applications, and the second network has one or more user devices communicably coupled thereto that are configured to interact with the voice and data applications on the first network. The switch transfers voice and/or data content between the applications on the first network and respective ones of the user devices on the second network. The disclosed integrated application delivery system further comprises a controller coupled to the switch. The controller employs at least one Finite State Machine (FSM) to control the interaction of the user devices with the voice and data applications. Specifically, the FSM is operative to control the transfer of voice/data signals and content between the respective user devices and the voice and data applications to give users the capability of simultaneously interacting with the applications via one or more user devices. For example, a user may engage in a voice session to interact with an Interactive Voice Response (IVR) system via a cell phone while simultaneously engaging in a data session to view related data from a database in a graphical and/or textual presentation format via a Personal Digital Assistant (PDA). As a result, the user has increased flexibility in managing his or her interaction with the voice and data applications, thereby achieving enhanced service effectiveness and user satisfaction.

Although the above-described integrated voice and data application delivery system allows users to engage in multiple voice and/or data sessions simultaneously, there is a need for allowing users to switch from one voice or data session to another. Specifically, there is a need for allowing users to switch from receiving information in a first presentation format via one or more first user devices to receiving the information in the same or a different presentation format via the same or one or more different user devices. For example, a user may engage in a voice session with an IVR system to receive information in an audible presentation format via a cell phone. In response to a particular event, e.g., the user may roam outside the service area of the cell phone, the cell phone service may be interrupted. There is a need for allowing the user in the event of such service interruption to switch from the current voice or data session to another session of the same or a different type. In this way, the user can continue receiving the desired voice or data content in the same presentation format or in a different presentation format without suffering a loss of information or a permanent interruption of service.

It would therefore be desirable to have an integrated voice and data application delivery system that is capable of delivering converged voice and data application services to user devices over at least one communications network. Such an integrated application delivery system would allow users to switch between voice and/or data sessions to receive information in the same or a different presentation format, via the same or a different user device, and over the same or a different communications network. It would also be desirable to have an integrated voice and data application delivery system that is capable of optimizing the delivery of voice and/or data content to user devices over communications networks based on the bandwidth of the networks and/or the capacity of the user devices.

SUMMARY OF THE INVENTION

In accordance with the present invention, an integrated voice and data application delivery system is provided that can deliver converged voice and data application services to at least one user device over at least one communications network, and optimize the delivery of voice or data content during a current voice or data session based on the bandwidth of the network and/or the capacity of the user device. The presently disclosed integrated application delivery system also allows users to switch from one voice or data session to another in response to one or more predetermined events, as required to avoid a loss of information or a permanent interruption of service.

In one embodiment, the integrated voice and data application delivery system is communicably coupled between at least one first communications network such as an Enterprise Internet Protocol (EIP) network and at least one second communications network such as the Public Switched Telephone Network (PSTN), a wireless network, a broadband network, and a fixed wireless/wireless broadband network. The first network is configured to convey one or more voice or data applications, and the second network has one or more user devices coupled thereto that are configured to interact with the voice and data applications on the first network. The integrated application delivery system comprises a switch such as a unified XML-based integrated voice and data media converging switch, a controller coupled to the switch, and a data storage device coupled to the controller. The switch is configured to transfer voice or data content between the voice and data applications on the first network and one or more of the user devices on the second network. The controller employs one or more Finite State Machines (FSMs) to control the interaction of the voice and data applications with the user devices, which may comprise Plain Old Telephone Service (POTS) telephones, cell phones, general-purpose computers, and/or Personal Digital Assistants (PDAs). Each FSM defines at least one sequence of operational states for one or more of the integrated voice and data applications. Further, a representation of each FSM is stored in the data storage device coupled to the controller for subsequent access by the controller.

The presently disclosed integrated voice and data application delivery system is configured to allow users to switch between voice and/or data sessions in response to at least one predetermined event such as an unscheduled service interruption, a user roaming from one network service area to another, a network reaching its maximum capacity or utilization level, the expiration of a scheduled interval of time, or any other suitable unscheduled or scheduled event. The controller is configured to provide an intelligent voice/data content transformation function operative to transform the desired information content provided by the voice or data application(s) on the first network from one audible/graphical/textual presentation format to another, as required by the user device(s) involved in the session switching. The switch is configured to provide a unified XML interchange function operative to direct the transformed information content to the target user device(s) on the second network(s). The unified XML interchange function provides the desired information content to the user devices over the respective communications networks in an audible presentation format during a voice session, a graphical and/or textual presentation format during a data session, or in a multi-modal voice/data presentation format for simultaneous voice and data sessions. Users may perform such session switching either automatically based on, e.g., at least one operational state defined by an FSM, or selectively based on, e.g., at least one command send by the user via a user device to the switch or the controller.

The presently disclosed integrated voice and data application delivery system is further configured to optimize the delivery of voice or data content to the user devices over the communications networks based on the bandwidth of the respective networks and/or the capacity of the respective user devices. The integrated application delivery system is configured to provide a controllable network interface function operative to provide a network interface compatible with the bandwidth of the target network.

Other features, functions, and aspects of the invention will be evident from the Detailed Description of the Invention that follows.

BRIEF DESCRIPTION OF THE DRAWING

The invention will be more fully understood with reference to the following Detailed Description of the Invention in conjunction with the drawings of which:

FIG. 9 depicts a sample of four groups of switching schemes processed, the causes for such switching, and the corresponding action performed by the system.

DETAILED DESCRIPTION OF THE PREFERRED EMBODIMENT

An integrated voice and data application delivery system is disclosed that has the capability of delivering converged voice and data application services to one or more user devices over one or more communications networks, and optimizing the delivery of the voice and data content based on the bandwidth of networks and/or the capacity of the user devices. The integrated voice and data application delivery system further allows users to perform voice/data session switching in response to one or more predetermined events.

Figure 1:
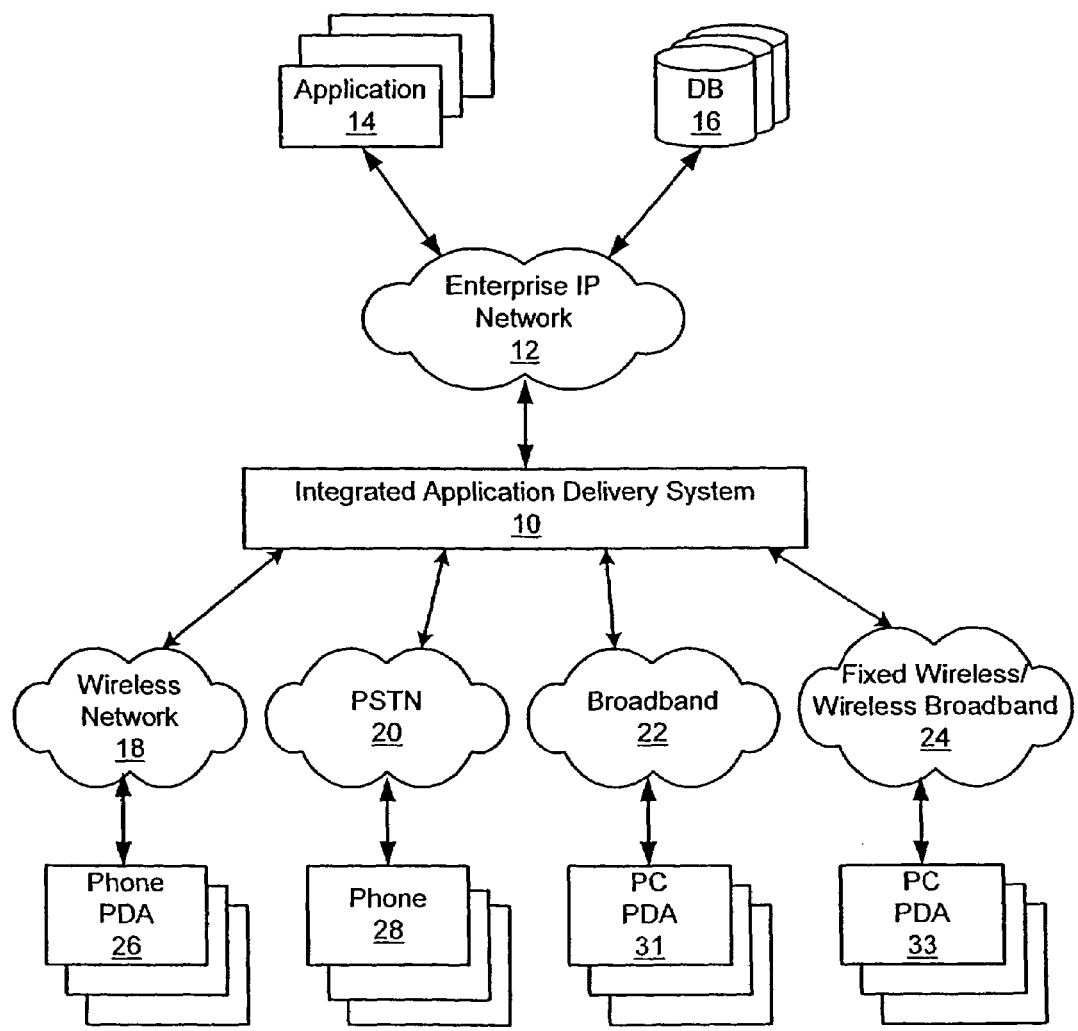
FIG. 1 is a block diagram of a communications network incorporating an integrated application delivery system deployable over multiple networks and heterogeneous devices according to the present invention.

FIG. 1 depicts an illustrative embodiment of an integrated voice and data application delivery system 10, in accordance with the present invention. In the illustrated embodiment, the integrated application delivery system 10 is coupled between at least one first communications network and one or more second communications networks. For example, the first communications network may comprise an Enterprise Internet Protocol (EIP) network 12. Further, the second communications networks may comprise a wireless network 18 conforming to P-LAN, Bluetooth, IEEE 802.11a, IEEE 802.11b (WiFi), UWB/HotSpots, 3G, or any other suitable wireless network technology; a Public Switched Telephone Network (PSTN) 20 conforming to voice PSTN, AIN/TCAP, Softswitch, voice/data PSTN, or any other suitable PSTN network technology; a broadband network 22 conforming to COAX, ISDN, XDSL, fiber (FFTH, FTTC), Hybrid Fiber Channel (HFC), TCP/IP, or any other suitable broadband network technology; and, a fixed wireless/wireless broadband network 24 conforming to LMDS, MMDS, satellite, or any other suitable fixed wireless/wireless broadband network technology.

The integrated application delivery system 10 is configured to allow voice and/or data signals and content to be delivered to one or more user devices 26, 28, 31, and 33 communicably coupled to the respective networks 18, 20, 22, and 24. The voice and data content can be delivered in a "thin-client" Extensible Markup Language (XML) format such as the Wireless Markup Language (WML), the HyperText Markup Language (HTML), voice XML, the Handheld Markup Language (HDML), the compact HDML (cHDML), or any other suitable XML format. Further, the voice and data content can be delivered in an intelligent client format such as formats for Palm® hand-held devices, devices based on the EPOC operating system, Pocket PCs, or any other suitable user device. During operation, the integrated application delivery system 10 detects the user device type and formats the voice or data content in a manner best suited for the accessing user device.

For example, if the accessing user device is a cell phone capable of communicating according to the Wireless Application Protocol (WAP), then the information content may be delivered in the WML format. Similarly, if the accessing user device is a Plain Old Telephone Service (POTS) telephone, then the information content may be delivered in voice XML. Moreover, if a user employs more than one device to access the desired information, then the content is delivered in multiple formats on multiple user devices over multiple networks simultaneously. For example, if a user employs a WAP enabled Personal Digital Assistant (PDA) and a cell phone in concert, then the information content is delivered in a unified XML converged format comprising the WML format for the PDA device and voice XML for the cell phone device. Specifically, the content in the WML format is delivered over the wireless network as data packets while the voice XML content is delivered over either the wireless network or a dedicated channel of the PSTN.

Figure 2:
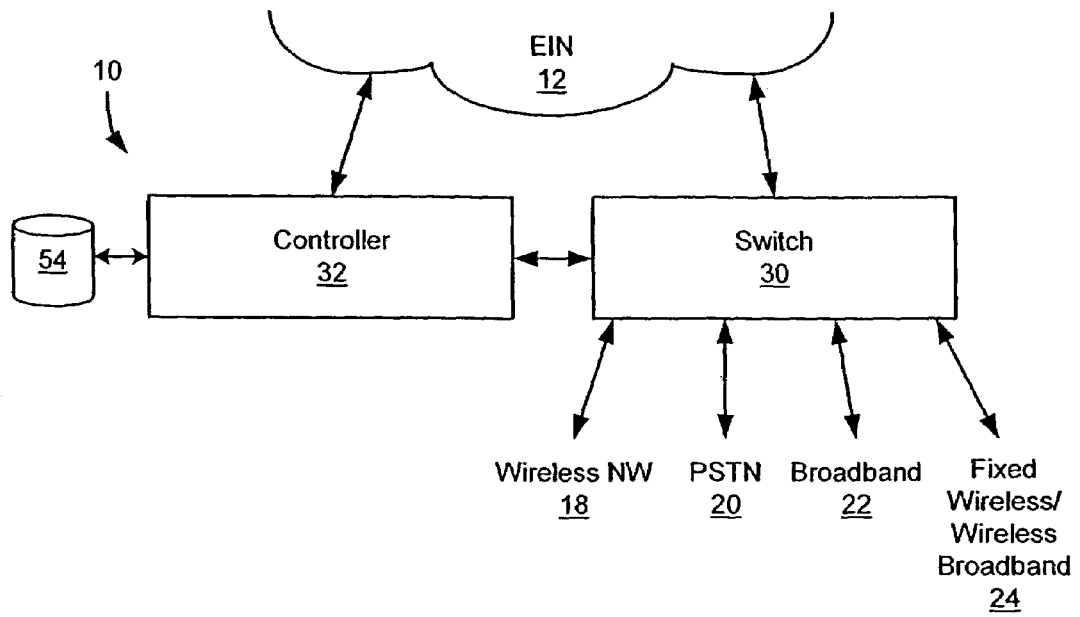
FIG. 2 is a block diagram of the integrated application delivery system of FIG. 1.

FIG. 2 depicts the structure of the integrated application delivery system 10 in greater detail. In the illustrated embodiment, the integrated application delivery system 10 includes at least one media converging switch 30, at least one unified XML runtime controller 32, and at least one unified XML metadata repository 54. As shown in FIG. 2, the switch 30 includes connections to the EIP network 12, the wireless network 18, the PSTN 20, the broadband network 22, and the fixed wireless/wireless broadband network 24. The controller 32 is communicably coupled to the switch 30 and the metadata repository 54, and includes a connection to the EIP network 12 for accessing voice and data applications 14 and databases 16 (see FIG. 1). The controller 32 is configured to control the delivery of voice and/or data content generated by the voice and data applications 14 via the switch 30 using a control protocol such as the MEdia GAteway COntrol (MEGACO) protocol. The switch 30 is configured to perform gateway-like functions including translating data packets between the EIP network 12 and the communications networks 18, 20, 22, and 24.

In the presently disclosed embodiment, the controller 32 comprises a software platform such as an Enterprise Java Beans (EJB) based distributed computing and communications environment that enables development, deployment, and management of wireless and wire-line applications and services that are protocol agnostic and device independent—regardless of hardware, operating system, protocol, and/or location. The software platform is an N-Tier distributed computing architecture that employs EJB component architecture, Java (J2EE), and XML technologies. The EJB component architecture provides support for transactional services and makes the technology distributed, portable, multi-tier, scaleable, and secure, and enables the deployment of the same code-base across multiple platforms. The Java development language is independent of the specific hardware or operating system. Its run-time compiled version creates byte-code that can be run on any platform supporting a Java Virtual machine. Such capability enables a single compiled version of released software that can be installed on different platforms such as UNIX and NT/2000 platforms or any other suitable platform.

Moreover, the converging switch 30 comprises an intelligent IP/PSTN/wireless switching router that can be connected on the edge of an IP network within an enterprise to provide intelligent switching and routing of messages and XML data packets between the EIP network 12, the wireless network 18, the PSTN 20, the broadband network 22, and the fixed wireless/wireless broadband network 24. The switch 30 has standard ports for connection to IP networks and PSTNs. Further, the switch 30 supports analog POTS, ISDN BRI/PRI, and T1/E1 CAS local loops. For example, convergent applications developed and deployed over a unified XML engine can use these interfaces to originate, terminate, and forward PSTN and wireless voice calls. The switch 30 also supports digital handsets supported by PBXs including Nortel Meridian™, Lucent/Avaya DEFINITY™, Siemens™, NECT™, and Mitel™ PBXs. As a result, the switch 30 can interface with PBX functionality including harnessing voice mail and integrating with data from an IP network. The switch 30 also supports IP-based media and signaling protocols via standards-based LAN technologies such as Bluetooth, IEEE 802.3 (Ethernet), IEEE 802.11a, IEEE 802.11b (WiFi), ANSI41, CCS/SS7, and HFC. Further, the switch 30 supports voice-over-IP (VoIP) based upon, e.g., H.323 or SIP. For example, in the H.323 environment, the switch 30 can function as a gateway, an endpoint, or a multipoint controller unit (MCU) for voice/data and video convergence. In the SIP environment, the switch 30 can function as a Client User Agent (CUA), a Server User Agent (SUA), or a proxy server. In both cases, the switch 30 can rely upon the Real Time Protocol (RTP) in either multicast or multi-unicast modes to transfer media streams.

The integrated application delivery system 10 can be configured to deliver both voice and data content to multiple user devices simultaneously and synchronously. For example, voice XML can be delivered to a user's cell phone 26 (see FIG. 1) while data content such as WML, a Web Clipping Application (WCA), or FlexScript is being delivered to the same user's PDA 31 (see FIG. 1). The user can interact with the voice and data content via the voice and data devices simultaneously in a synchronized fashion. Because the integrating functionality resides within the integrated application delivery system 10, this integrated voice/data interaction can be achieved without having to re-write the existing applications 14 or databases 16, which individually may be limited to only data or voice interaction as in traditional corporate databases or Interactive Voice Response (IVR) systems.

Figure 3:
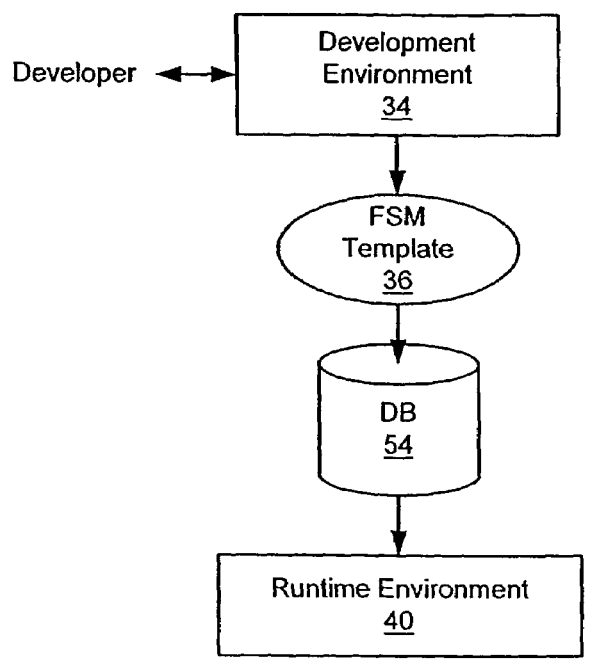
FIG. 3 is a block diagram showing the relationship between a development environment and a run-time environment for the integrated application delivery system of FIGS. 1-2.

FIG. 3 depicts the development of an integrated voice/data application instance, which may be used by the integrated application delivery system 10 (see FIG. 1). Specifically, an application developer interacts with a development environment 34 to produce a Finite State Machine (FSM) template 36, which is subsequently stored in the metadata repository 54. The stored FSM template 36 is provided to a run-time environment 40 forming part of the controller 32 (see FIG. 2). The FSM template 36 defines a sequence of operational states of an integrated voice/data application. In particular, the FSM template 36 identifies data and media (voice or video) files or streams associated with each state, connections or paths to the user devices involved in the session, and other pertinent information.

Figure 4:
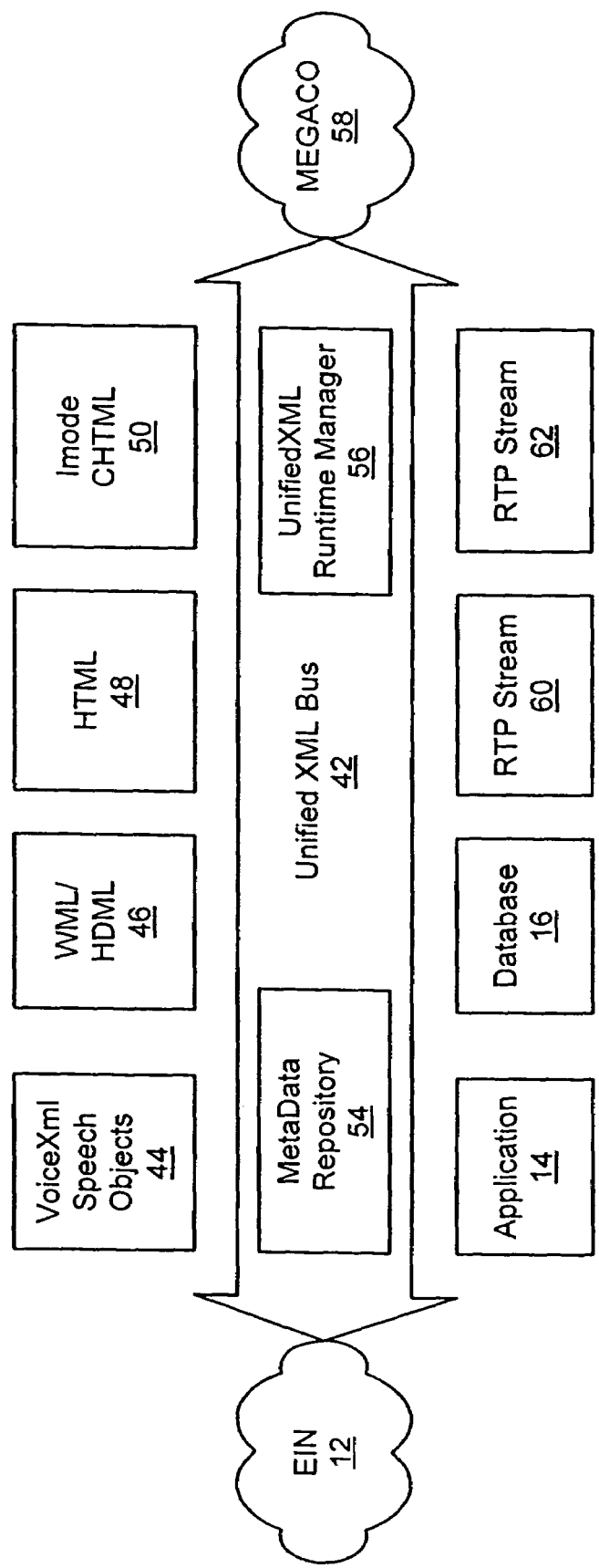
FIG. 4 is a block diagram of a unified XML engine, which is part of a controller in the runtime environment of FIG. 3.

FIG. 4 depicts an illustrative embodiment of a unified XML bus 42, which is a component of the controller 32 (see FIG. 2). The unified XML bus 42 allows various heterogeneous XML DTD formats (vocabularies) to be integrated on a single software platform, thereby allowing convergence, unification, and delivery of different presentation formats without modifying their vocabularies or DTD. These XML vocabularies include commonly available formats like voice XML or speech objects 44, WML/HDML 46, HTML 48, and iMode/cHTML 50, and are capable of being rendered on both wire-line and wireless devices through the switch 30 (see FIG. 2). A specific format of XML (such as WML 46) can be seamlessly delivered with another format of XML (such as Voice XML 44) without modifying headers, tags, or the overall structure. Within the context of the unified XML bus 42, different XML formats can be delivered with a programmable application context allowing, e.g., both WML to be delivered on a PDA and voice XML to be delivered over a POTS or cell phone. The unified XML bus 42 is capable of supporting future versions of XML vocabularies or DTDs, thereby making the unified XML platform upward compatible with virtually any presentation standard. The unified XML metadata repository 54 (see also FIG. 2) maintains the context of the application transaction and delivers different XML formats on different devices via a runtime manager 56. The controller 32 is connected to the EIP network 12 (see FIG. 2) and operates with the switch 30 via a MEGACO protocol 58.

While the above description of the unified XML bus 42 focuses on the storage and transfer of application data as discrete files such as XML files, it is understood that in alternative embodiments the application data may be structured in a stream-oriented fashion such as an RTP stream. As indicated by exemplary RTP streams 60 and 62 of FIG. 4, such stream-oriented data can also be integrated on the unified XML bus 42.

Figure 5:
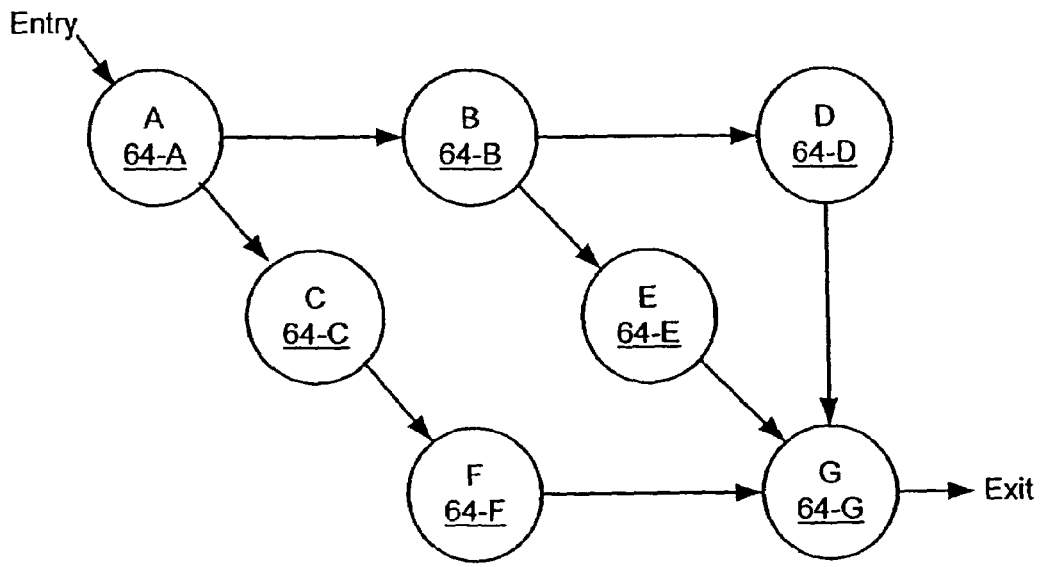
FIG. 5 is a diagram of a finite state machine template created in the development environment and utilized in the run-time environment of FIG. 3.

FIG. 5 depicts an illustrative embodiment of the FSM template 36 (see FIG. 3). In the illustrated embodiment, each user device connection is associated with an instantiation of the FSM, and each voice/data session is allocated a unique context specific to the session and is governed by the state of the FSM. Each of the states 64-A-64-G within the FSM is associated with a set of properties whose value changes upon state transitions. The set of properties include user authentication and authorization details, session variables, application context, conditions for transition to a next state, and the user's channel and device parameters. These properties are kept persistent by the unique instantiation of the FSM. Upon invocation of an integrated application, an initial state such as the state 64-A is entered, and one or more initial data and/or voice files are provided to the user as dictated by the application. Depending on the user input, the FSM enters one of the two subsequent states 64-B or 64-C. This pattern continues through the states 64-D-64-F to the exit state 64-G.

In addition to the FSM template 36 (see FIG. 3), the integrated application delivery system 10 maintains a "unifier stack" data structure that identifies different versions of XML files that can be delivered either synchronously or asynchronously on different user devices. The stack maintains pointers to these files; the files themselves are generally stored elsewhere in the EIP network 12. The XML files may be developed using the integrated development system of FIG. 3, or may be provided by third parties. Further, a voice XML file may be delivered to a cell phone, a WML file may be delivered to a WAP-enabled PDA, and a Short Message Service (SMS) message may be delivered to the cell phone.

An exemplary unifier stack has the following structure:

| 1 | Voice XML file 1 | Device A | |
|---|---|---|---|
| 2 | WML file 1 | Device B | Asynch |
| 3 | Voice XML file 2 | Device A | Asynch |
| 4 | WML file 2 | Device B | Asynch |
| 5 | SMS file 1 | Device A | Asynch |

The first pointer identifies a voice XML file to be delivered to a "Device A", which in this exemplary case is a cell phone. The user hears the voice XML call and interacts with it via voice commands, as defined within the context of the voice XML programming logic. The second pointer identifies a WML file to be delivered to a "Device B" such as a PDA. This file is to be delivered "asynchronously", i.e., upon occurrence of a predetermined event. For example, the predetermined event may be the completion of the previous file (i.e., the voice XML file 1) or an explicit command contained in the voice XML file 1 to send WML file 1. The third pointer identifies a second voice XML file for delivery to the cell phone (Device A). Further user interaction with this voice XML file may ensue. The fourth pointer identifies a second WML file to be delivered to the PDA. Finally, the fifth pointer identifies an SMS message to be delivered to the cell phone upon successful delivery and termination of the program on the PDA.

FIG. 9 illustrates different switching schemes processed, the causes for such switching, and the corresponding actions performed by the inventive system. There are 4 groups:

(a) Types 1 through 4 illustrate voice switching between two devices over the same or different carriers;

(b) Types 5 through 8 illustrate a voice session switching to a data session over the same or different carriers;

(c) Types 9 through 12 illustrate a data session switching between two devices or same device over the same of different carriers; and finally (d) Types 13 through 16 illustrate a data session switching to a voice session over the same of different carriers.

The session switching capability and corresponding actions processed by the current embodiment are as follows:

1) In the first type of session switching as illustrated by the first line in FIG. 9, a user's voice session on Device A on a carrier C1 is switched to another voice session on the same device on the same carrier. The cause for this type of switching is Roaming, identified in the FIG. 9 as RO. No action is required and is illustrated in the figure as PR prior art suggesting that this circumstance represents a situation found in the prior art.

2) In the second type of session switching, as illustrated in the second line in the FIG. 9, a user's voice session on Device A on a carrier C1 is switched to another voice session on the same device over carrier C2. This is not a normal circumstance and is identified by NN in the illustration. This may occur because a device supplied by a phone carrier is typically capable of being operated under one carrier only. As a result no corresponding switching action is performed by this invention as illustrated by NA in FIG. 9. This reflects that the action is Not-Applicable. In some instances a device A on carrier C1 may operate on other carrier's network C2 if and only if the two carriers have a mutual roaming relationship. In a case, such roaming is already known in the prior art and is not addressed by the present invention.

3) In the third type of session switching, shown in the third line of FIG. 9, a user's voice session on device A on carrier C1 is switching to another voice session on another device B but over the same carrier. The figure illustrates that the actions performed are: "NN, IR, UI, NC, EV suggestion that although this is generally not a norm (NN), but possible causes can be IR for an unscheduled service interruption, UI user initiated or intentional, NC for network reaching its maximum capacity of utilization level or EV for a scheduled or an unscheduled event. No prior art addresses such switching, which is performed by the system of the invention. The possible actions performed by the inventive system are: "SS, AU" suggesting that upon detecting the cause, the session is switched to the other device. Authentication is again required upon connection of the second session.

4) In the fourth type of session switching, a user's voice session on carrier C1 is switched to another voice session on device B over another carrier C2. The cause for such switching could be "RO, IR, UI, NC, EV suggesting that although this is due to a subscriber roaming into the other carrier's C2 network (RO) that has a relationship with the previous carrier C1, or IR for an unscheduled service interruption, UI suggesting a user initiated or an intentional switching action, NC for network reaching its maximum capacity of utilization level, or EV for a scheduled or an unscheduled event. No prior art addresses such switching, which is performed by the inventive system. The actions performed by the invention are "SS, AU" suggesting that upon detecting the cause, the session is switched to the other device. Authentication is required upon connection of the second session.

5) In the fifth type of session switching, a user's voice session on carrier C1 is switched to a data session on the same device over the same carrier. The cause for such switching could be "RO, IR, UI, EV" suggesting that although this is due to RO for a subscriber roaming into a data network of the same carrier that was delivering voice capability, IR for a unscheduled service interruption in the same carrier network, UI for user initiated and intentional, and EV for a scheduled or an unscheduled event. No prior art addresses such switching, which is performed by the current embodiment of the invention. The actions performed by the invention are "SS, SM*, CT, AC, BW" suggesting that upon detecting the cause, the session is switched, in this case from one media (voice) to another (data), SM* suggesting that the second session which is data is kept simultaneously alive while keeping still keeping voice session prior to switching.

6) In the sixth type of session switching, a user's voice session on carrier C1 is switched to a data session on a different carrier C2 on the same device. The cause for such switching could be "RO, IR, UI, EV" suggesting that although this is due to RO for a subscriber roaming into a data network of the same carrier that was delivering voice capability, IR for a unscheduled service interruption in the same carrier network, UI for user initiated and intentional, and EV for a scheduled, or an Unscheduled event. No prior art addresses such switching, which is performed by the inventive system. The actions performed by this invention are "SS, SM*, AU, CT, AC, BW" suggesting that upon detecting the cause, session SS is switched in this case from one media (voice) to another (data), SM* suggesting that the second session which in this case is data proceeds concurrently to the voice session, AU suggesting that the second session has to be authenticated by the user because the user has been switched to anther carrier network, CT to perform content transformation from voice to data in an XML format in such a way that the content adapts to the device AC within the confines of the bandwidth BW supported on the new network.

7) In the seventh type of session switching, a user's voice session on carrier C1 is switched from one device A to a data session on another device B within the same carrier network. Although the cause for such switching could be "RO, IR, UI, NC, EV" suggesting that this is due to a subscriber roaming into a data network of the same carrier, IR for a unscheduled service interruption in the same carrier network, UI for user initiated and intentional switching, and EV for a scheduled or an unscheduled event. No prior art addresses such switching, which is performed by the inventive system. The actions performed by this invention are "SS, SM*, CT, AC, BW" suggesting that upon detecting the cause, the session SS is switched, in this case from one media (voice) to another (data), SM* suggests that the second session which in this case is data, proceeds concurrently with the voice session should the user so choose. Alternatively, the former session terminates when the session is switched, AU suggesting that the second session has to be authenticated by the user because the user has been switched to anther device even though it's the same carrier network, CT to perform content transformation from voice to data in an XML format in such a way that the content adapts to the device AC within the confines of the bandwidth BW supported on the network.

8) In the eighth type of session switching, a user's voice session on carrier C1 is switched from one device A to a data session on another device B operating on a different carrier network B. The cause for such switching could be "RO, IR, UI, NC, EV" suggesting that this is due to a subscriber roaming into a data network of a different carrier, IR for a unscheduled service interruption in the carrier network, UI for user initiated and intentional switching, and EV for a scheduled or an unscheduled event. No prior art addresses such switching and is performed by the inventive system. The actions performed by the invention are "SS, SM*, CT, AC, BW" suggesting that upon detecting the cause, session SS is switched, in this case from one media (voice) to another (data), SM* suggesting that the second session which in this case is data proceeds concurrently with the voice session should the user so choose. Alternatively, the former session terminates when the session is switched, AU suggesting that the second session has to be authenticated by the user because the user has been switched to anther device specifically because it's a different carrier, CT to perform content transformation from voice to data in an XML format in such a way that the content adapts to the device AC within the confines of the bandwidth BW supported on the new network.

9) In the ninth type of session switching, a user's data session using device A on carrier C1 is switched to the same carrier's higher or lower bandwidth network on the same device. This could happen when a user is on a wireless local area network over WI-FI wireless has just left the general area of high bandwidth wireless connectivity and has roamed into the same carrier's lower bandwidth network. In this case the user is carrying the same device. The cause for such switching is generally roaming RO. The actions performed by the invention are "MI, SS, AU, CT, AC, BW" suggesting it implements MI for the Mobile UP specification that addresses such switching and is implemented by the current embodiment as illustrated by MI. No prior art addresses the mechanisms of such switching or augmented capability required. For example, upon detecting the cause, the session SS is switched between two different networks of the same carrier with different bandwidths and usage. It performs the content transformation CT to meet the needs of the second network and its bandwidth or capacity.

10) In the tenth type of session switching, a user's data session using device A on carrier C1 is switched to a different carrier with similar, higher or lower bandwidth albeit on the same device. This could happen, for example, when a user connected via a device on a wireless network leaves the general area and enters another general area of wireless connectivity provided by another wireless operator. The cause for such switching is generally roaming RO, IR for interruption, UI intentionally initiated by the user or a consequence of a scheduled or an unscheduled event. The actions performed by the invention are "MI, SS, AU, CT, AC, BW" suggesting it implements MI for the Mobile IP specification that addresses such switching. And, as suggested in the previous step, no prior art addresses the mechanisms of such switching of the augmented capability required. For example, upon detecting the cause, the session SS is switched between two different networks with perhaps different bandwidths and usage. The inventive system performs the content transformation CT to meet the needs of the second network and its bandwidth or capacity.

11) In the eleventh type of session switching, a user's data session using device A on carrier C1 is switched to another device B with the same carrier with similar, higher or lower bandwidth. This could happen, for example, when a user connected via a device on a wireless network is about to leave from the general area and enter into another general area of wireless connectivity provided by the same wireless operator. The user in, this case, intends to switch from one wireless device to another—perhaps from a laptop connected wirelessly to a wireless personal digital assistant. The cause for such switching is "UI, EV" suggesting that it is user initiated and intentional. The switching could be because of either a scheduled or an unscheduled event. The actions performed by the invention are "MI, SS, AU, CT, AC, BW" suggesting it implements MI for the Mobile IP specification that addresses such switching. And, as suggested in the previous step, no prior art addresses the mechanisms of such switching or the augmented capability required. For example, upon detecting the cause, the session SS is switched between two different devices on a network served by a single carrier but perhaps varying degrees of bandwidth capacity. Content transformation CT is performed to meet the needs of the same of different network and its bandwidth or capacity.

12) In the twelfth type of session switching, a user's data session using device A on carrier C1 is switched to another device B on a different carrier with similar, higher or lower bandwidth. This could happen, for example, when a user connected via a device on a wireless network is about to leave the general area and enter another general area of wireless connectivity provided by another wireless operator. The user in, this case, intends to switch from one wireless device to another—perhaps from a laptop connected wirelessly to a wireless personal digital assistant. The cause for such switching is "RO, IR, UI, NC, EV" suggesting that it may be a result of a user roaming RO, an interrupt IR that may be scheduled or unscheduled, user initiated and intentional UI, exceeding network capacity on one network, or of a scheduled or an unscheduled event. The actions performed by the invention are "MI, SS, AU, CT, AC, BW" suggesting it implements MI is implemented for the Mobile IP specification that addresses such switching. And, as suggested in the previous step, no prior art provides the mechanisms for such switching or the augmented capability required. For example, upon detecting the cause, the session SS is switched between two different devices on two different networks being operated by different carriers with varying degrees of bandwidth capacity. Content transformation CT is performed to meet the needs of the different network and its specific bandwidth or capacity.

13) In the thirteenth type of session switching, a user's data session on carrier C1 is switched to a voice session on the same device over the same carrier but on a voice network. The cause for such switching could be "RO, IR, UI, NC, or EV" suggesting that this is due to a subscriber roaming RO from a data to a voice network of the same carrier that was delivering wireless data capability, IR suggesting an unscheduled service interruption in the same carrier network, UI suggesting a user initiated and intentional switching, NC suggesting detection of peak utilization of network resources and EV for a scheduled or an Unscheduled event. No prior art addresses such switching as is performed by the inventive system. The actions performed by this invention are "SS, SM*, AU*, CT" suggesting that, upon detecting the cause, session SS is switched in this case from one media (data) to another (voice). SM* suggests that the second session which is voice is kept simultaneously alive while keeping the earlier data session prior to switching. AU* suggests that the authentication requirements are dependent upon carrier needs (e.g., a carrier can selectively seek authentication from users or depending upon many variables such as whether a user's voice device can be authenticated. Alternatively, a carrier may choose to require no further authentication. Furthermore, appropriate content transformation CT is performed and adaptive content (AC) delivered over the new voice network, i.e., where the session has been switched.

14) In the fourteenth type of session switching, a user's data session on carrier C1 is switched to a voice session on the same device over another carrier's voice network. The cause for such switching is the same as case 13 except that the session is switched to the voice network of another carrier. The actions performed by this invention are similar to previous example (i.e., case 13) as upon detecting the cause, session SS from one media (data) to another (voice) on a different carrier's network.

Authentication is mandated because the new device is on another carrier's voice network.

15) In the fifteenth type of session switching, a user's data session on carrier C1 is switched to a voice session using some other device over the same carrier's voice network. The cause for such switching is the same as previous case (i.e., case 14) except that the user does not have a device capable of delivering both voice and data. The actions performed by the invention are similar to previous example, as upon detecting the cause, session SS is switched from one media (data) to another (voice) on the same network. Authentication again is optional because the same carrier may not be able to authenticate the user's voice device. Alternatively, the carrier of service may choose to enable authentication.

16) In the sixteenth and final type of session switching, a user's data session on carrier C1 using device A is switched to a voice session using some other device B over the some other carrier's voice network. The cause for such switching is the same as case 15 except that the user does not have a device capable of delivering both voice and data. The actions performed by the invention are similar to previous instance as upon detecting the cause, session SS is switched from one media (data) to another (voice) on the same network. Authentication again is mandated because the second carrier may not be able to authenticate the user's voice device and application privileges.

A Finite State machine, as illustrated in FIG. 5, manages the state, session and context of the inventive system. The state and context components share the switching cause and actions table of FIG. 9. Each state in the FSM keeps the metadata (metadata is information such as data about the data) of the switching cause/action table. For example, a probable cause for switching such as RO (FIG. 9) referring to a user roaming from one network service area to another may suggest one or more actions to be performed such as SS to switch session variables, CT to do content transformation and perhaps adapting the content AC to meet specific device signature. This could be followed by user level authentication AU because the session is switched from one carrier to another. Yet in another state, a roaming event RO may warrant simply a Session switching action and content transformation without adapting the content to that specific network or performing other actions.

The FSM for Session Switching variables inherits two packages or major modules to invoke various interfaces to switch session during its execution.

SwitchingCause and
    SwitchingActions

These Interfaces are consistent with the naming convention suggested earlier. These are:

Roaming
    ServiceInterruption
    UserInitiated
    NetworkLimit
    Events
    NoOp
    SwitchSessionConnect
    Authenticate
    Transformation
    Adapt
    Bandwidth
    DataRoaming Each interface defines methods that can be invoked: For example in Interface SwitchSession contains the following methods:

SSvoiceToData
    SSvoiceToVoice
    SSdataToVoice

SSdataToData
SSvoiceToDataSynch
SSvoiceToVoiceSynch
SSdataToVoiceSynch
SSdataToDataSynch Also, for example, The Interface DataRoaming contains two implementations of two classes:
MobileIP
IPSec The interface DataRoaming has sub interfaces such as Mobile IP and IPsec that is an implementation of MobileIP specification and IPsec specification (http://www.ietf.org).

Figure 6:
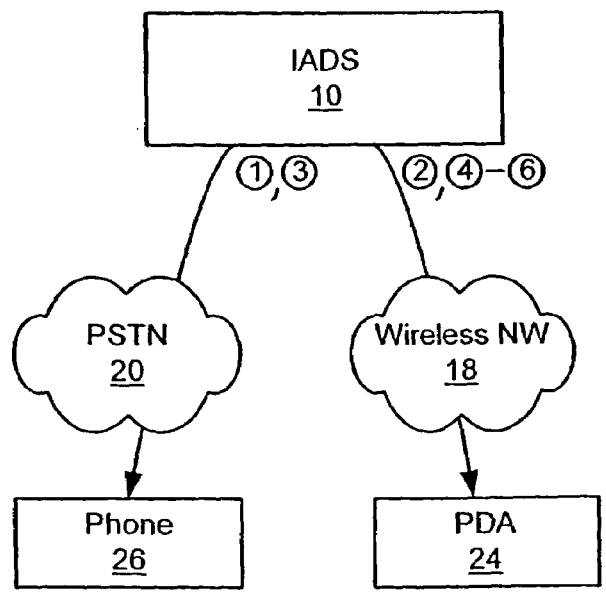
FIG. 6 is a block diagram illustrating a first operating example of the integrated application delivery system of FIGS. 1-2.

The presently disclosed integrated application delivery system 10 (see FIG. 6) will be better understood with reference to the following illustrative examples. FIG. 6 depicts a first illustrative example, in which a user employs the POTS telephone 26 and the PDA 24 to interact with a voice and data application for vending tickets such as tickets to a sporting event. The integrated voice and data application has an associated FSM template 36 (see FIG. 3) and a unifier stack residing in the integrated application delivery system 10 that define, along with the application itself, the nature of the user's interaction. In this example, there are six steps in the interaction, each step involving the delivery of voice/data content over respective paths in the wireless network 18 and the PSTN 20, as indicated by the circled numbers in FIG. 6. In each case, the switch 30 (see FIG. 2) operates under the control of the controller 32 to direct the appropriate file from an entity on the EIP network 12 to the appropriate communications network and user device:

1. The IADS 10 in the ticketing enterprise delivers the IVR ticketing application via voice XML over the PSTN 20 to the user's phone 26, thereby enabling the user to use voice-based commands to seek availability of the tickets.

2. The IADS 10 delivers data representing a seating layout over the wireless network 18 to the user's PDA 24. The user can examine this graphical information to help decide which seats to choose. Once a choice is made, the user can indicate the choice via the phone 26 and the IVR system.

3. The ticketing enterprise delivers voice XML over the PSTN 20 to seek verbal acknowledgment of the selection and authorization from the user.

4. At the same time, a WML message may be sent to the user's PDA 24 over the wireless network 18 including a screen by which the user can submit his/her credit card number or other payment information.

5. Upon fulfilling the order, the ticketing enterprise can send an acknowledgement of the order in the form of a data message to the user's PDA 24 via the wireless network 18.

6. Optionally, a voice call can be placed over the wireless network 18 to deliver a voice XML acknowledgment message to the user's cell phone.

Figure 7:
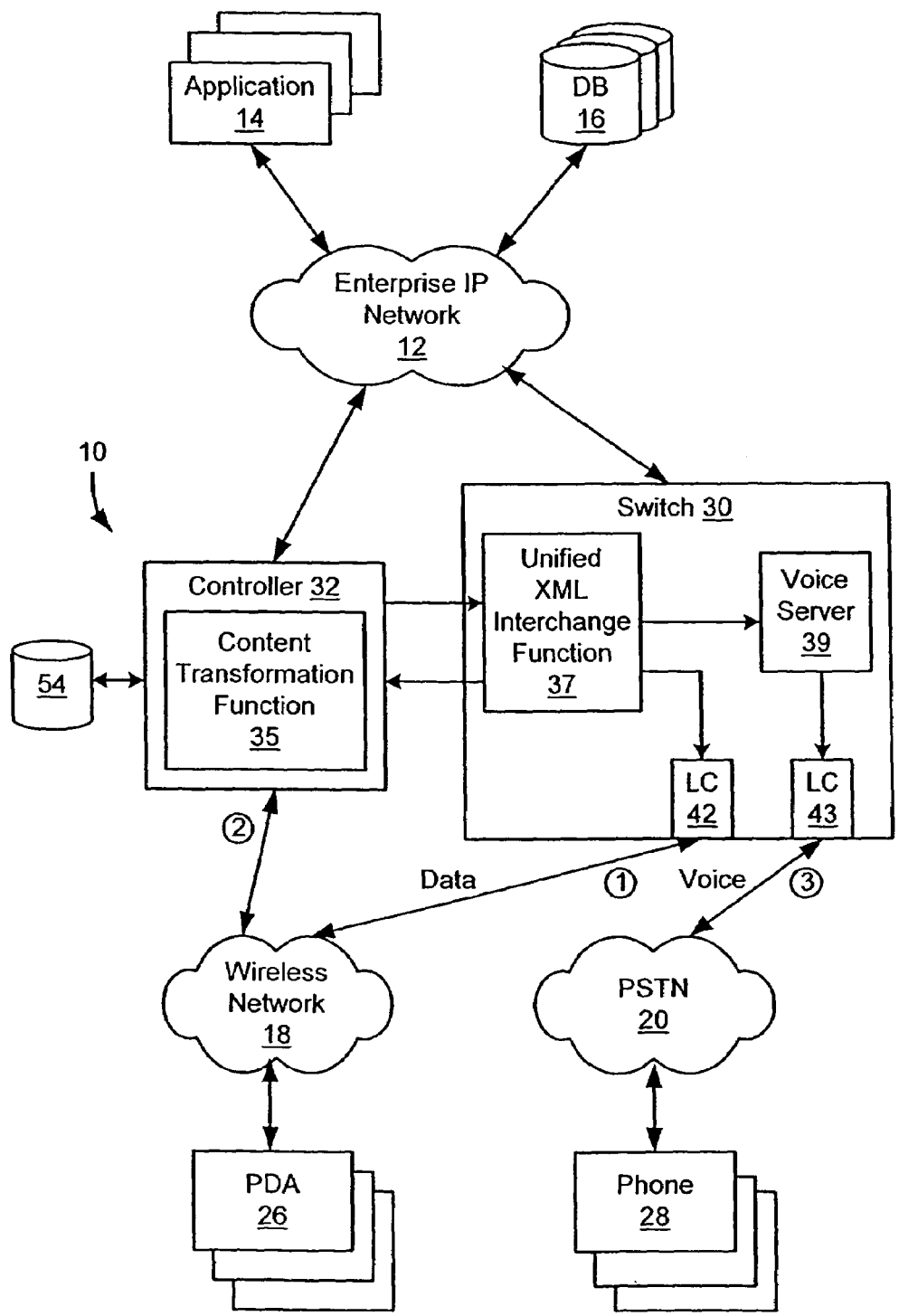
FIG. 7 is a block diagram illustrating a second operating example of the integrated application delivery system of FIGS. 1-2.

FIG. 7 depicts a second illustrative example, in which a user performs session switching, particularly, the user switches from a data session to a voice session in response to a predetermined event. For example, the predetermined event may be an unscheduled service interruption, the user roaming from one network service area to another, a network reaching its maximum capacity or utilization level, the expiration of a scheduled interval of time, the sending of a command by the user via a user device to the switch 30 or the controller 32, or any other suitable unscheduled or scheduled event. As in the first example, an FSM template and a unifier stack may be developed to define the nature of the user's interaction with the integrated voice and data application 14. In this second example, the user interacts with the voice and data application 14 to access one or more e-mail messages. Further, there are three steps in the interaction, each step involving the delivery of voice/data signals or content over respective paths in the wireless network 18 and the PSTN 20, as indicated by the circled numbers in FIG. 7. Again, the switch 30 operates under the control of the controller 32 to direct the appropriate file from an entity on the EIP network 12 to the appropriate communications network and user device:

1. The integrated application delivery system 10 comprising the switch 30 and the controller 32 delivers data content representing selected e-mail messages via cHDML over the wireless network 18 to the user's PDA 24. The controller 32 accesses the selected e-mail messages via the application 14 over the EIP network 12, performs an intelligent voice/data content transformation 35 of the e-mail messages to transform the messages to cHDML, as required by the PDA 24, and provides the transformed e-mail messages to the switch 30. Next, the switch 30 performs a unified XML interchange 37 on the e-mail messages to direct the associated data content to the target PDA device 24 via a line card 41 and the wireless network 18.

2. In response to an unscheduled service interruption, the user sends a command to the controller 32 via the wireless network 18 using the PDA 24 to instruct the integrated application delivery system 10 to re-direct the remaining e-mail messages to the user's phone 26.

3. The controller 32 accesses the remaining e-mail messages via the application 14 over the EIP network 12, performs the intelligent voice/data content transformation 35 of the e-mail messages to transform the messages to voice XML, as required by the user's phone 26, and provides the transformed e-mail messages to the switch 30. Next, the switch 30 performs the unified XML interchange 37 on the e-mail messages to re-direct the voice content associated with the remaining e-mail messages to the target phone 26 via a voice server 39, a line card 43, and the PSTN 20.

It is understood that users may perform such session switching either automatically or selectively to switch from receiving information in a first presentation format over one or more of the communications networks 18, 20, 22, and 24 via one or more of the user devices 26, 28, 31, and 33 (see FIG. 1) to receiving the information in the same or a different presentation format, over the same or a different communications network, and via the same or a different user device. For example, the entire context of a voice/data session may be switched from one carrier to another.

Figure 8:
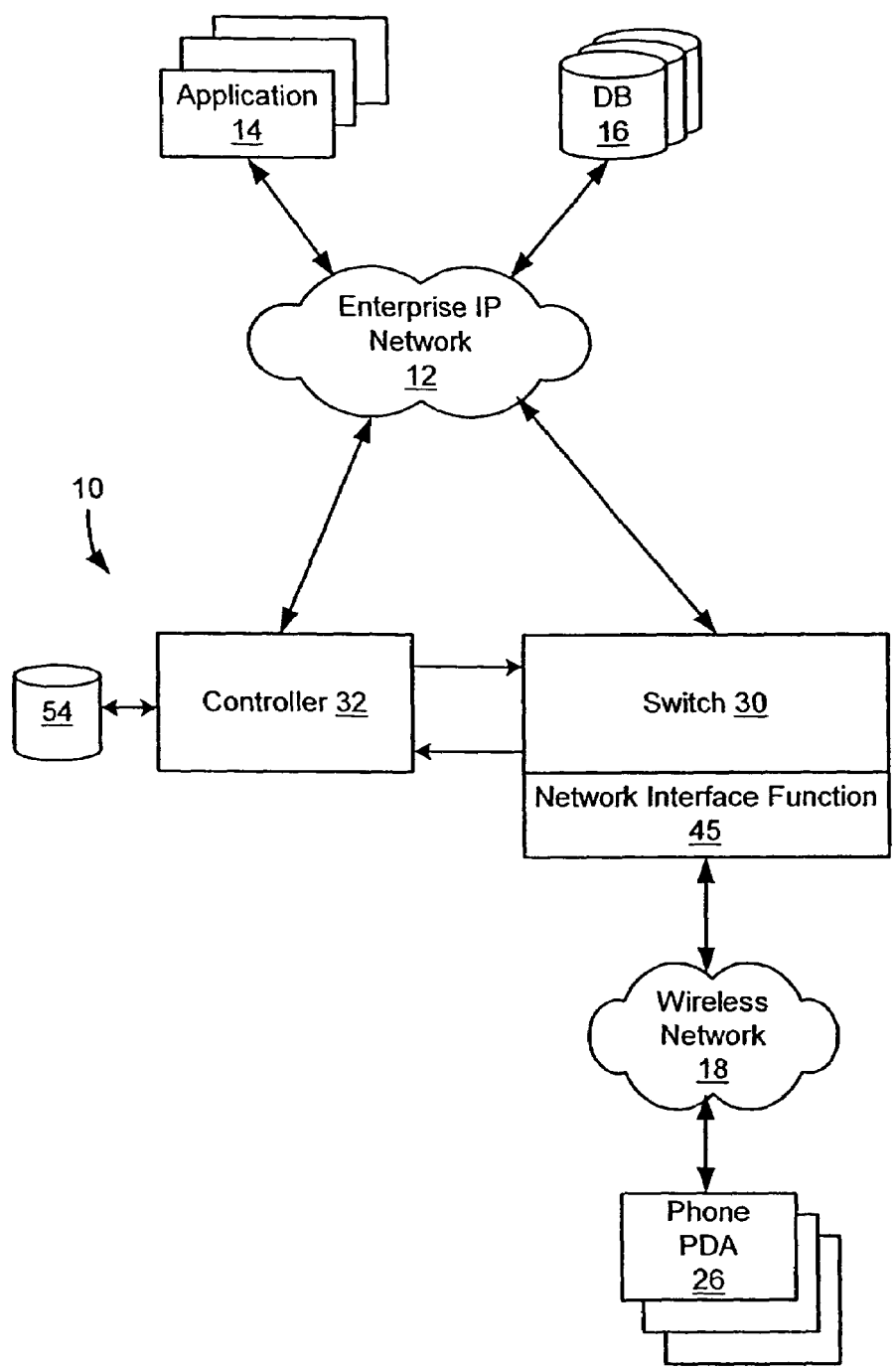
FIG. 8 is a block diagram illustrating a third operating example of the integrated application delivery system of FIGS. 1-2.

FIG. 8 depicts a third illustrative example, in which the integrated application delivery system 10 optimizes the delivery of voice or data content to a user device over a communications network based on the bandwidth of the network and/or the capacity of the user device. Particularly, the integrated application delivery system 10 optimizes the delivery of data content to the PDA 24 over the wireless network 18 based on the bandwidth of the wireless network 18. As in the first and second examples described above, the switch 30 operates under the control of the controller 32 to direct the appropriate file(s) from an entity on the EIP network 12 to the wireless network 18 and the PDA 24. Specifically, the integrated application delivery system 10 comprising the switch 30 and the controller 32 accesses parameters of the wireless network 18 via, e.g., an IP probe. For example, the wireless network 18 may conform to P-LAN, Bluetooth, IEEE 802.11a, IEEE 802.11b (WiFi), UWB/HotSpots, 3G, or any other suitable wireless network technology, and the wireless network parameters may be accessed to determine the corresponding network bandwidth. Next, the integrated application delivery system 10 performs a controllable network interface function 45 to provide a network interface compatible with the bandwidth of the target network 18. The integrated application delivery system 10 then delivers the data content to the PDA 24 over the wireless network 18 via the compatible network interface 45.

It is understood that the integrated application delivery system 10 may perform such optimization of voice/data content delivery to one or more user devices over one or more networks such as the wireless network 18, the PSTN 20, the broadband network 22, the fixed wireless/wireless broadband network 24, or any other suitable communications network. In this way, voice/data content can be manufactured and delivered based on the network bandwidth, the network protocol, the network capacity, and/or the user device capacity. Further, the controllable network interface function 45 can be performed in conjunction with session switching to switch voice/data sessions across multiple communications networks with variable bandwidths. Moreover, the integrated application delivery system 10 (see FIGS. 1-2) may further optimize the delivery of voice/data content by merely delivering a portion, e.g., the header, of a file to the target user device(s) over the appropriate bandwidth-limited network(s).

It will further be appreciated by those of ordinary skill in the art that modifications to and variations of the above-described integrated voice and data application delivery system may be made without departing from the inventive concepts disclosed herein.

What is claimed is:

1. An application delivery system for delivering converged voice and data applications to a user thereof, comprising:
   a) a first communications network configured for conveying at least one of the application types: a voice application and a data application;
   b) a second communications network configured for conveying information and adapted for communication with at least one user device;
   c) at least one user device operatively connected to said second communications network and configured to at least receive voice and data from said second communications network thereby simultaneously establishing, respectively a voice session, a data session, and a voice/data session;
   d) a converging switch disposed between and operatively connected to said first and said second communication network, said converging switch configured and adapted to allow switching at least one of said voice session and said data session responsive to a condition, thereby preventing communication termination; and
   e) a controller operatively connected to said converging switch; whereby a user of said at least one user device may switch from one of said voice, data and voice/data sessions to another of said voice, data and voice/data session in response to a predetermined event.

2. The application delivery system as recited in claim 1, wherein said at least one user device comprises a single user device adapted for establishing both a voice and data session substantially simultaneously.

3. The application delivery system as recited in claim 1, wherein said at least one user device comprises two user devices, each adapted for establishing one of a voice session and a data session.

4. The application delivery system as recited in claim 1, wherein at least one of said first communications network and said second communications network comprises one of the network types: an Enterprise Net Protocol (EIP), a Publics Switched Telephone Network (PTSN), a wireless network, broadband network, and a fixed wireless/broadband network.

5. The application delivery system as recited in claim 1, wherein said converging switch comprises means for optimizing delivery of at least one of: voice content and data content.

6. The application delivery system as recited in claim 5, wherein said optimizing of delivery of at least one of: voice content and data content is based on at least one of: the bandwidth of at least one of said first and said second communications network, and the capacity of said at least one user device.

7. The application delivery system as recited in claim 5, wherein said voice content and said data content are embedded in an XML format data stream.

8. The application delivery system as recited in claim 1, wherein at least controller comprises a finite state machine (FSM).

9. The application delivery system as recited in claim 1, wherein said converging switch comprises means for performing intelligent voice/data content transformation from said first communications network to said second communications network.

* * * * *